(12) United States Patent
Major et al.

(10) Patent No.: US 8,931,299 B2
(45) Date of Patent: Jan. 13, 2015

(54) AIR CONDITIONING SYSTEM HAVING INTEGRATED CHILLER AND THERMAL STORAGE

(75) Inventors: Gregory A. Major, Farmington Hills, MI (US); William R. Hill, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1935 days.

(21) Appl. No.: 12/030,942

(22) Filed: Feb. 14, 2008

(65) Prior Publication Data

US 2009/0205346 A1  Aug. 20, 2009

(51) Int. Cl.
*F25D 17/02* (2006.01)
*B60H 1/00* (2006.01)
*F25D 16/00* (2006.01)

(52) U.S. Cl.
CPC ............ *B60H 1/005* (2013.01); *B60H 1/00885* (2013.01); *B60H 2001/00928* (2013.01); *F25D 16/00* (2013.01)
USPC .............................................. 62/435; 62/244

(58) Field of Classification Search
USPC .................................................... 62/434–435
See application file for complete search history.

(56) References Cited

U.S. PATENT DOCUMENTS

2008/0022713 A1 * 1/2008 Jacobi ............................. 62/434

* cited by examiner

*Primary Examiner* — Lakiya Rogers

(57) ABSTRACT

An air conditioning system for a vehicle and a method of operation is disclosed. The air conditioning system includes a primary refrigerant loop and a secondary liquid loop. The primary refrigerant loop includes a compressor configured to be selectively driven by the engine, a condenser, an expansion device and a refrigerant-to-liquid heat exchanger. The secondary liquid loop includes the refrigerant-to-liquid heat exchanger, a thermal storage reservoir within which the refrigerant-to-liquid heat exchanger is mounted, a pump configured to pump a liquid through the refrigerant-to-liquid heat exchanger, a liquid-to-air heat exchanger configured to mount in a HVAC module and receive the liquid from the refrigerant-to-liquid heat exchanger, and a liquid flow valve configured to selectively direct the liquid directly to the pump or through the thermal storage reservoir to the pump.

6 Claims, 3 Drawing Sheets

AIR CONDITIONING SYSTEM HAVING INTEGRATED CHILLER AND THERMAL STORAGE

BACKGROUND OF INVENTION

The present invention relates generally to heating, ventilation and air conditioning (HVAC) systems for vehicles, and more particularly to thermal storage for HVAC systems in vehicles.

Some hybrid vehicles do not have the capability to provide air conditioning comfort when the engine is off. To improve the overall fuel economy of the vehicles, however, it is generally preferable to have the engine off as often and as long as possible. Nonetheless, not having continuous air conditioning capability may be unsatisfactory to vehicle occupants as compared to conventional vehicles where the engine runs all of the time-allowing for air conditioning whenever desired.

In order to address this concern, some have proposed systems for hybrid vehicles that provide air conditioning even when the engine is off. For example, some hybrid vehicles include refrigerant compressors that have their own electric motor to drive them so they can be driven independently of the engine. Others not only have a separate motor to drive the refrigerant compressor, but also incorporate a dual drive mechanism where the compressor can be electrically driven and also be driven directly off of the accessory drive belt of the engine. However, both of these solutions add to the weight and cost of the vehicle due to the addition of the extra compressor motor as well as the electronics and cables to operate the motor.

Still others have attempted to alleviate this concern by providing refrigerant thermal storage systems and/or secondary loop coolant systems that allow for air conditioning comfort during engine off vehicle operation. While thermal storage and/or secondary loop systems may be employed in the air conditioning systems, a need arises to minimize the cost and packaging space required to operate the air conditioning system under engine-off vehicle operating conditions while still maximizing the fuel economy benefit achieved with hybrid vehicles. That is, an air conditioning system that only provides for short engine-off operation may minimize the cost of the system, but may significantly reduce the fuel economy improvement of the hybrid vehicle, while an air conditioning system that allows for long engine-off operation may be cost prohibitive for certain hybrid vehicles.

In addition, for conventional engine driven vehicles, there may be a desire to provide a HVAC system with a secondary loop and thermal storage. For example, in vehicles where the refrigerant compressor is turned on and off to control capacity at light loads, thermal storage may allow the compressor to remain off for longer periods. This may improve the fuel economy. Again, though, it is desirable to minimize the cost and packaging space while maximizing the fuel economy benefit.

SUMMARY OF INVENTION

An embodiment contemplates an integrated chiller and thermal storage assembly for use in an air conditioning system having a primary refrigerant loop and a secondary liquid loop. The integrated chiller and thermal storage assembly may comprise a thermal storage reservoir configured to contain a liquid for use in the secondary liquid loop, a refrigerant-to-liquid heat exchanger mounted inside the thermal storage reservoir, a first refrigerant line configured to direct a refrigerant from the primary refrigerant loop into the refrigerant-to-liquid heat exchanger, and a second refrigerant line configured to direct the refrigerant from the refrigerant-to-liquid heat exchanger into the primary refrigerant loop. The integrated chiller and thermal storage assembly may also comprise a pump configured to pump the liquid from the secondary liquid loop through the refrigerant-to-liquid heat exchanger and back into the secondary liquid loop, a liquid flow valve configured to selectively direct the fluid from the secondary liquid loop to one of a first liquid line leading to an inlet to the pump and to a second liquid line leading into the thermal storage reservoir, and a third liquid line configured to direct the liquid in the thermal storage reservoir to the inlet to the pump.

An embodiment contemplates an air conditioning system for a vehicle having an engine. The air conditioning system includes a primary refrigerant loop and a secondary liquid loop. The primary refrigerant loop includes a compressor configured to be selectively driven by the engine, a condenser, an expansion device and a refrigerant-to-liquid heat exchanger. The secondary liquid loop includes the refrigerant-to-liquid heat exchanger, a thermal storage reservoir within which the refrigerant-to-liquid heat exchanger is mounted, a pump configured to pump a liquid through the refrigerant-to-liquid heat exchanger, a liquid-to-air heat exchanger configured to mount in a HVAC module and receive the liquid from the refrigerant-to-liquid heat exchanger, and a liquid flow valve configured to selectively direct the liquid directly to one of the pump and the refrigerant-to-liquid heat exchanger or through the thermal storage reservoir to one of the pump and the refrigerant-to-liquid heat exchanger.

An embodiment contemplates a method of operating an air conditioning system of a vehicle, the method comprising the steps of: operating in a first operating mode by: operating an engine driven compressor in a primary refrigerant loop; flowing a cooled refrigerant from the primary refrigerant loop through a chiller mounted in a thermal storage reservoir; pumping a liquid in a secondary liquid loop through the chiller; flowing the liquid through a liquid-to-air heat exchanger; and flowing the liquid from the liquid-to-air heat exchanger through a liquid flow valve that directs the liquid to the chiller; and operating in a second operating mode by: operating the engine driven compressor in the primary refrigerant loop; flowing the cooled refrigerant from the primary refrigerant loop through the chiller mounted in the thermal storage reservoir; pumping the liquid in the secondary liquid loop through the chiller; flowing the liquid through the liquid-to-air heat exchanger; flowing the liquid from the liquid-to-air heat exchanger through the liquid flow valve; and directing the liquid from the liquid flow valve through the thermal storage reservoir and then to the chiller.

An advantage of an embodiment is that the mass of the chiller is incorporated into the thermal storage reservoir for the secondary loop, increasing the cold thermal mass of the secondary loop. This allows for improved engine-off air conditioning performance for hybrid vehicles. This integrated chiller and thermal storage assembly may be particularly advantageous when employed in belt-alternator-starter hybrid vehicles by minimizing the cost, extra components, and/or the additional weight needed to provide engine-off air conditioning comfort, while increasing the time during which the air conditioning system may operate with the engine off. Moreover, even with thermal mass in the system, the thermal inertia is minimized for times of high air conditioning demand, such as initial passenger compartment cool down.

Another advantage of an embodiment is that the thermal mass may cool down more quickly upon vehicle startup with the chiller submerged directly in the thermal storage reservoir. This may allow for engine-off operation sooner after startup, thus improving the vehicle fuel economy.

Another advantage of an embodiment is that, with the chiller integrated in the thermal storage reservoir, packaging space for the system may be reduced.

DETAILED DESCRIPTION

Figure 1:
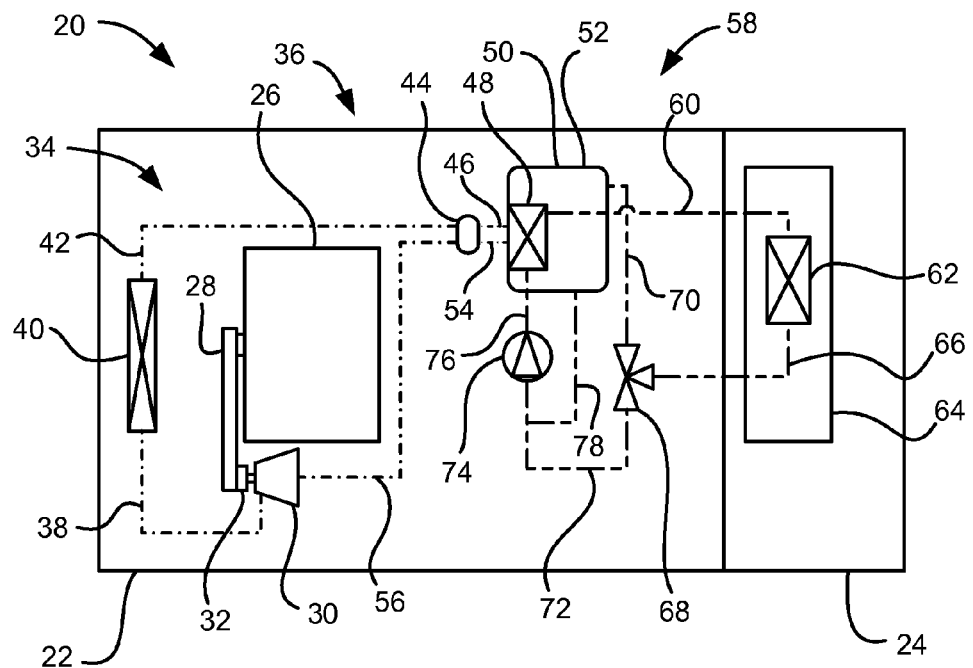
FIG. 1 is a schematic illustration of a vehicle air conditioning system.

Referring to FIG. 1, a vehicle, indicated generally at 20, is shown. The vehicle 20 includes an engine compartment 22 and a passenger compartment 24. An engine 26 is located in the engine compartment 22 and may include an accessory drive 28 (such as a pulley and belt) to selectively drive a refrigerant compressor 30 through a clutch 32. The compressor 30 is part of a primary (refrigerant) loop 34 of an air conditioning system 36.

The primary loop 34 also includes a refrigerant line 38 directing refrigerant from the compressor 30 to a condenser 40. The refrigerant lines in FIG. 1 are shown with dash-dot-dash lines. Another refrigerant line 42 in the primary loop 34 directs the refrigerant from the condenser 40 to an expansion device, such as a thermal expansion valve 44. From the thermal expansion valve 44, a refrigerant line 46 directs the refrigerant into a refrigerant-to-liquid heat exchanger (chiller) 48, which is mounted inside of a thermal storage reservoir 50 and forms part of an integrated chiller and thermal storage assembly 52. Another refrigerant line 54 directs the refrigerant from the chiller 48 to another portion of the thermal expansion valve 44, with a refrigerant line 56 directing the refrigerant from this portion of the valve 44 back to the compressor 30 to complete the primary loop 34.

The air conditioning system also includes a secondary (liquid) loop 58. The secondary loop 58 includes the chiller 48 and the thermal storage reservoir 50, within which is contained a liquid to be cooled (a coolant), such as, for example, a mix of water and ethylene glycol, although the coolant that flows through the secondary loop 58 may be comprised of other types of suitable liquids with desirable thermal transfer properties if so desired. A coolant line 60 directs the coolant from the chiller 48, out of the thermal storage reservoir 50 and to a cooling heat exchanger 62. The cooling heat exchanger 62 is a liquid-to-air heat exchanger and may be mounted in a HVAC module 64 in the passenger compartment 24. The coolant lines in FIG. 1 are shown as phantom lines to distinguish them from refrigerant lines. A coolant line 66 directs the coolant from the cooling heat exchanger 62 to a liquid flow valve 68, which includes an actuator for electronically controlling the valve 68.

The liquid flow valve 68 may be actuated to direct the coolant through a coolant line 70 into the coolant stored in the thermal storage reservoir 50 or into a coolant line 72 that directs the coolant to an electric pump 74. The output of the electric pump 74 is connected to a coolant line 76 that directs the coolant into the chiller 48. Also, another coolant line 78 connects the coolant stored in the thermal storage reservoir 50 to the inlet to the pump 74, completing the various coolant flow paths for the secondary loop 58. Alternatively, the pump 74 may be located in the secondary loop 58 just downstream of the chiller 48 rather than just upstream of the chiller 48.

Figure 2:
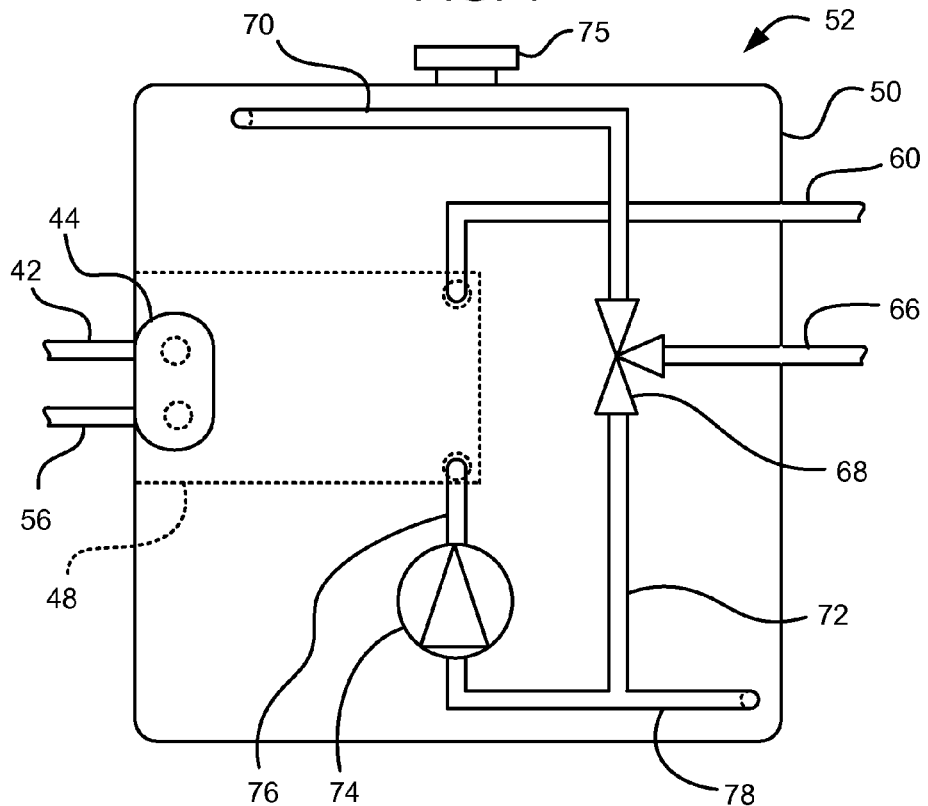
FIG. 2 is a schematic, front elevation view of an integrated chiller and thermal storage assembly according to a first embodiment.
Figure 3:
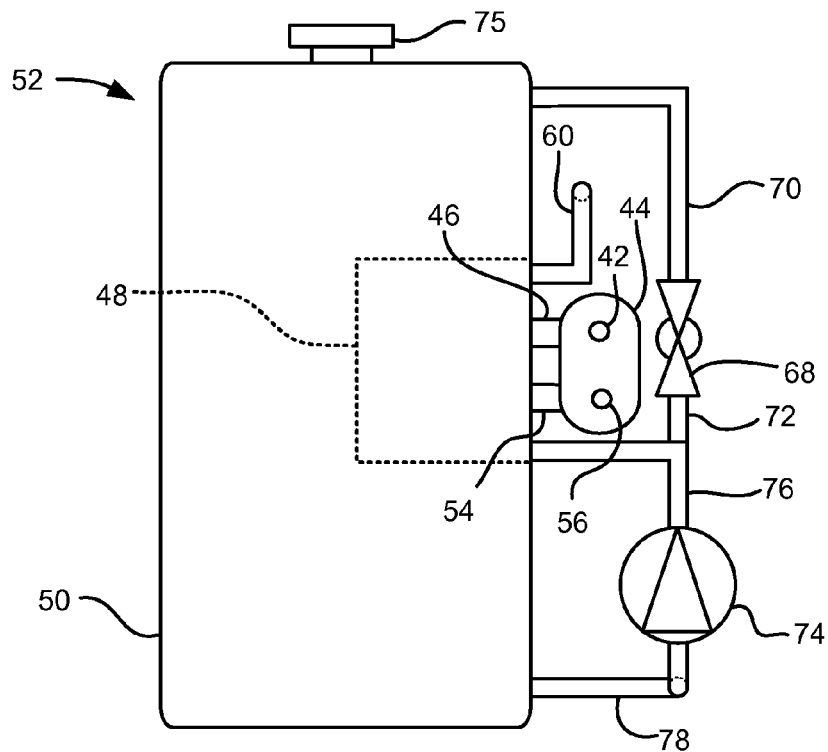
FIG. 3 is a schematic, side elevation view of the integrated chiller and thermal storage assembly of FIG. 2.

FIGS. 2 and 3 illustrate the integrated chiller and thermal storage assembly 52 of FIG. 1 in more detail, with the components arranged in a compact and easily packaged configuration. In order to avoid unnecessary repetition, elements in FIGS. 2 and 3 that correspond to elements in FIG. 1 will be labeled with the same element numbers, even if not specifically discussed relative to FIGS. 2 and 3.

The chiller 48 is, of course, mounted inside of the thermal storage reservoir 50 and submerged in coolant, to form the integrated chiller and thermal storage assembly 52. The other components are mounted on one side of the integrated chiller and thermal storage assembly 52. The chiller 48 is mounted adjacent to the side of the thermal storage reservoir 50 where the connections with the refrigerant and coolant lines are made. The pump 74 is mounted outside of but adjacent to the reservoir 50. Preferably, the coolant line 70 connects to the reservoir 50 at a higher elevation and is spaced away from the location where the coolant line 78 connects to the reservoir 50. Also, the thermal storage reservoir 50 may include a secondary loop fill cap 75 mounted on top. Alternatively, the fill cap may be mounted at an in-line location.

The operation of the air conditioning system 36 will be discussed with reference to FIGS. 1-3. In a first operating mode, when the engine 26 is operating and there is a demand for air conditioning, the clutch 32 is engaged, causing the accessory drive 28 to drive the compressor 30. Also, the pump 74 is activated. The compressor 30, condenser 40 and expansion valve 44 behave the same as with a conventional air conditioning refrigerant loop, but with the chiller 48 acting as the evaporator.

This first operating mode may be used, for example, during an initial period of cool down of the passenger compartment 24, the liquid flow valve 68 may be actuated to cause the coolant to flow from the coolant line 66 into the coolant line 72, blocking the flow into the coolant line 70. The cooled refrigerant flowing through the chiller 48 absorbs heat from the coolant flowing through the chiller 48. The cooled coolant then flows through the coolant line 60 and through the cooling heat exchanger 62, where the coolant absorbs heat from air in the HVAC module 64 flowing through the cooling heat exchanger 62. The coolant then flows through the coolant line 66 back to the valve 68.

The chiller 48, being located in the thermal storage reservoir 50, may also cool the coolant adjacent to the chiller 48 somewhat. However, in the first operating mode, this should not create a substantial thermal inertia that delays providing cooled coolant to the cooling heat exchanger 62.

A second operating mode may be used, for example, after the initial cool down period when the air conditioning demand in the passenger compartment 24 is much less. The engine 26, compressor 30 and pump 74 are still operating. The liquid flow valve 68 is actuated to direct coolant from the coolant line 66 into the coolant line 70, blocking flow directly to the pump 74 from the valve 68. The redirected coolant, then, will flow through the coolant line 70 into the thermal storage reservoir 50, with coolant flowing from the reservoir 50 to the pump 74 via the coolant line 78. The coolant continues to be cooled by the refrigerant as it flows through the chiller 48. Thus, over time, the coolant contained in the thermal storage reservoir 50 is also cooled, providing a mass of cooled liquid.

For a hybrid vehicle, the vehicle may operate at times with the engine 26 off even though there is air conditioning demand in the passenger compartment 24. With the engine 26 off, the compressor 30 is not driven, so the primary loop 34 is not operational. However, a third operating mode can be used to employ the already cooled coolant in the thermal storage reservoir 50 to meet the air conditioning demand. With the electric pump 74 operating and the liquid flow valve 68 actuated to direct coolant from the coolant line 60 into the coolant line 70, warmer coolant flowing from the cooling heat exchanger 62 will be directed into the upper portion of the reservoir 50 via the coolant line 70. The previously cooled coolant will be drawn out near the bottom of the reservoir via the coolant line 78, flow through the pump 74, the chiller 48, and then to the cooling heat exchanger 62. This cooled coolant will then absorb heat from the air flowing through the cooling heat exchanger 62, thus providing air conditioning comfort to the passenger compartment 24 even though the engine 26 is off. This may continue until the cooled coolant can no longer cool the air flowing through the cooling heat exchanger 62, at which time the engine 26 (and compressor 30) may be restarted.

With the chiller 48 submerged in the coolant of the thermal storage reservoir 50, the cold thermal mass of the chiller 48 and refrigerant contained therein adds to the thermal mass of the coolant in the reservoir 50. Thus, the cooled thermal mass of the integrated chiller and thermal storage assembly 52 is greater than just the coolant in the thermal storage reservoir 50. This additional cooled thermal mass may allow for longer engine off periods with continuous air conditioning provided to the passenger compartment 24 (while minimizing the initial thermal inertia of the air conditioning system 36 as discussed above).

Figure 4:
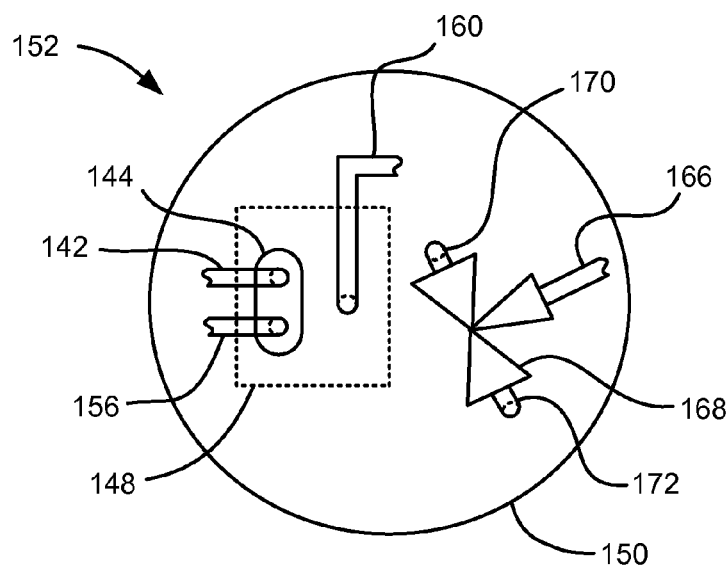
FIG. 4 is a schematic, plan view of an integrated chiller and thermal storage assembly according to a second embodiment.
Figure 5:
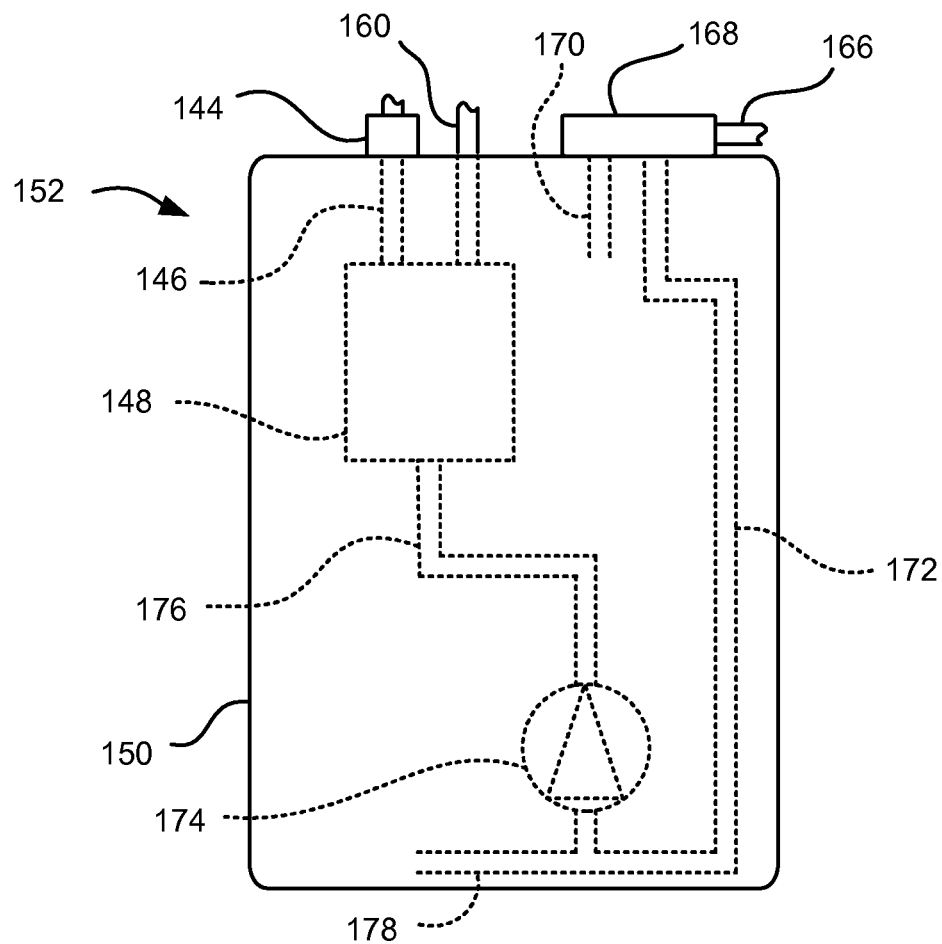
FIG. 5 is a schematic, elevation view of the integrated chiller and thermal storage assembly of FIG. 4.

FIGS. 4 and 5 illustrate a second embodiment of the integrated chiller and thermal storage assembly 152. Since this embodiment is similar to the first, similar element numbers will be used for similar elements, but employing 100-series numbers. Also, in order to avoid unnecessary repetition, elements in FIGS. 4 and 5 that correspond to elements in FIGS. 1-3 will be labeled with the similar element numbers (i.e., in the 100-series), even if not specifically discussed relative to FIGS. 4 and 5. In this embodiment, similar components are employed and produce the same modes of operation, but the arrangement and packaging of the components is changed somewhat. Consequently, the integrated chiller and thermal storage assembly 152 may better package into particular vehicles than the assembly 52 of the first embodiment.

In addition to the chiller 148, the pump 174 is now mounted inside the thermal storage reservoir 150 as well. The thermal expansion device 144 and the coolant flow valve 168 are both mounted on top of the reservoir 150, allowing for a relatively small footprint when viewing the assembly 152 in the plan view. The refrigerant and coolant lines extend between the same components and perform the same functions as in the first embodiment.

While certain embodiments of the present invention have been described in detail, those familiar with the art to which this invention relates will recognize various alternative designs and embodiments for practicing the invention as defined by the following claims.

What is claimed is:

1. An integrated chiller and thermal storage assembly for use in an air conditioning system having a primary refrigerant loop and a secondary liquid loop, the integrated chiller and thermal storage assembly comprising:
   a thermal storage reservoir configured to contain a liquid for use in the secondary liquid loop;
   a refrigerant-to-liquid heat exchanger mounted inside the thermal storage reservoir;
   a first refrigerant line configured to direct a refrigerant from the primary refrigerant loop into the refrigerant-to-liquid heat exchanger;
   a second refrigerant line configured to direct the refrigerant from the refrigerant-to-liquid heat exchanger into the primary refrigerant loop;
   a pump configured to pump the liquid from the secondary liquid loop through the refrigerant-to-liquid heat exchanger and back into the secondary liquid loop;
   a liquid flow valve configured to selectively direct the fluid from the secondary liquid loop to one of a first liquid line leading to an inlet to the pump and to a second liquid line leading into the thermal storage reservoir; and
   a third liquid line configured to direct the liquid in the thermal storage reservoir to the inlet to the pump.

2. The integrated chiller and thermal storage assembly of claim 1 wherein the pump is mounted inside the thermal storage reservoir.

3. The integrated chiller and thermal storage assembly of claim 1 including a thermal expansion device operatively engaging the first refrigerant line.

4. The integrated chiller and thermal storage assembly of claim 3 wherein the thermal expansion device and the liquid flow valve are mounted on top of the thermal storage reservoir.

5. The integrated chiller and thermal storage assembly of claim 1 wherein the second liquid line operatively engages the thermal storage reservoir at an elevation that is higher than an elevation where the third liquid line operatively engages the thermal storage reservoir.

6. The integrated chiller and thermal storage assembly of claim 1 wherein the pump is mounted outside of the thermal storage reservoir.

* * * * *